United States Patent

Mao et al.

(10) Patent No.: US 11,958,972 B2
(45) Date of Patent: Apr. 16, 2024

(54) POLYPHENYLENE ETHER COMPOSITIONS HAVING IMPROVED MECHANICAL AND HEAT PROPERTIES

(71) Applicant: SHPP GLOBAL TECHNOLOGIES B.V., Bergen op Zoom (NL)

(72) Inventors: Rui Mao, Shanghai (CN); Shijie Song, Shanghai (CN)

(73) Assignee: SHPP Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 18/195,533

(22) Filed: May 10, 2023

(65) Prior Publication Data
US 2023/0374301 A1 Nov. 23, 2023

(30) Foreign Application Priority Data
May 18, 2022 (EP) .................................... 22174138

(51) Int. Cl.
*C08L 71/12* (2006.01)
*C08K 7/14* (2006.01)

(52) U.S. Cl.
CPC ................ *C08L 71/12* (2013.01); *C08K 7/14* (2013.01); *C08L 2203/20* (2013.01); *C08L 2205/03* (2013.01); *C08L 2207/04* (2013.01)

(58) Field of Classification Search
CPC ....... C08L 71/12; C08L 71/123; C08L 71/126
See application file for complete search history.

(56) References Cited

U.S. PATENT DOCUMENTS

| | | |
|---|---|---|
| 7,439,284 B2 | 10/2008 | Alger et al. |
| 8,933,155 B2 | 1/2015 | Lietzau et al. |
| 10,647,840 B2 | 5/2020 | Wang et al. |
| 2019/0352503 A1 | 11/2019 | Cheng et al. |

FOREIGN PATENT DOCUMENTS

| | | |
|---|---|---|
| EP | 0849328 B1 | 7/2008 |
| JP | H08-311772 A | 11/1996 |
| JP | 2004-217771 A | 8/2004 |
| JP | 2004-315647 A | 11/2004 |
| JP | 2004-315649 A | 11/2004 |
| JP | 2017-196875 A | 11/2017 |
| JP | 2020-015796 A | 1/2020 |
| WO | 2016/142803 A1 | 9/2016 |
| WO | 2019/139812 A1 | 7/2019 |
| WO | 2019/186400 A1 | 10/2019 |
| WO | 2020/109970 A1 | 6/2020 |
| WO | 2021/186252 A1 | 9/2021 |

OTHER PUBLICATIONS

Extended European Search Report dated Nov. 10, 2022 in EP22174138.2 (5 pgs.).

*Primary Examiner* — Ana L. Woodward
(74) *Attorney, Agent, or Firm* — Quicker Law, LLC

(57) ABSTRACT

A thermoplastic composition includes: (a) about 30 wt % to about 60 wt % of a resin component including polyphenylene ether (PPE) and polystyrene (PS); (b) from about 35 wt % to about 65 wt % of a filler component; (c) from about 1 wt % to about 5 wt % of a flow promoter including at least a partially hydrogenated hydrocarbon resin; and (d) an elastomer component including from 2.5 wt % to 5 wt % rubber content in the composition excluding the filler component. The combined weight percent value of all components does not exceed 100 wt %, and all weight percent values are based on the total weight of the composition except as indicated in (d).

13 Claims, No Drawings

POLYPHENYLENE ETHER COMPOSITIONS HAVING IMPROVED MECHANICAL AND HEAT PROPERTIES

FIELD OF THE DISCLOSURE

The present disclosure relates to filled thermoplastic compositions, and in particular to polyphenylene ether (PPE) and polystyrene (PS) based thermoplastic compositions that have improved mechanical and heat properties.

BACKGROUND OF THE DISCLOSURE

Many components for use in 5G network applications require good dielectric performance. This may include thermoplastic components. MIMO (multiple input, multiple output) antenna designs are being used for 5G base stations; they require lighter and thinner designs at a higher operating power. As a result, components for use in these applications should have low density, high strength and high heat resistance. A traditional base station antenna material is a printed circuit board (PCB), which provides good dielectric properties but has a high cost. They also require additional assembly processes. One conventional thermoplastic solution for dipoles is polyphenylene sulfide (PPS) with glass fiber, but these compositions are heavy and expensive. In addition, large and thin components made from these compositions tend to warp.

Compared with PPS-based materials, polyphenylene oxide (PPO)-based materials have lower density and demonstrate less warpage. They could also be more cost effective. However, these materials have inferior mechanical strength, heat resistance, and flow. In particular the heat ageing performance of such materials is poor.

These and other shortcomings are addressed by aspects of the present disclosure.

SUMMARY

Aspects of the disclosure relate to thermoplastic compositions including: (a) about 30 wt % to about 60 wt % of a resin component including polyphenylene ether (PPE) and polystyrene (PS); (b) from about 35 wt % to about 65 wt % of a filler component; (c) from about 1 wt % to about 5 wt % of a flow promoter including at least a partially hydrogenated hydrocarbon resin; and (d) an elastomer component including from 2.5 wt % to 5 wt % rubber content in the composition excluding the filler component. The combined weight percent value of all components does not exceed 100 wt %, and all weight percent values are based on the total weight of the composition except as indicated in (d).

DETAILED DESCRIPTION

The present disclosure relates to PPO-based thermoplastic compositions having excellent heat aging performance together with high tensile strength, heat resistance and flowability. The resin type and composition are balanced to offer the desired heat aging performance and physical properties. In particular, the concentration of flow promoter and rubber in the resin and saturability of the rubber affect these properties. High rubber concentration can facilitate heat aging performance but at the cost of tensile strength and HDT. Low rubber concentration or unsaturated rubber can result in inferior heat aging performance. The concentration of flow promoter may also be adjusted to balance flowability, tensile strength and heat distortion temperature (HDT).

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting.

Various combinations of elements of this disclosure are encompassed by this disclosure, e.g., combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

Definitions

It is also to be understood that the terminology used herein is for the purpose of describing particular aspects only and is not intended to be limiting. As used in the specification and in the claims, the term "comprising" can include the aspects "consisting of" and "consisting essentially of" Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a filler component" includes compositions including two or more fillers.

As used herein, the term "combination" is inclusive of blends, mixtures, alloys, reaction products, and the like.

Ranges can be expressed herein as from one value (first value) to another value (second value). When such a range is expressed, the range includes in some aspects one or both of the first value and the second value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the designated value, approximately the designated value, or about the same as the designated value. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

Unless otherwise stated to the contrary herein, all test standards are the most recent standard in effect at the time of filing this application.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

Thermoplastic Compositions

In some aspects a thermoplastic composition including: (a) about 30 wt % to about 60 wt % of a resin component including polyphenylene ether (PPE) and polystyrene (PS); (b) from about 35 wt % to about 65 wt % of a filler component; (c) from about 1 wt % to about 5 wt % of a flow promoter including at least a partially hydrogenated hydrocarbon resin; and (d) an elastomer component including from 2.5 wt % to 5 wt % rubber content in the composition excluding the filler component. The combined weight percent value of all components does not exceed 100 wt %, and all weight percent values are based on the total weight of the composition except as indicated in (d).

Polyphenylene ether (PPE), also referred to as polyphenylene oxide (PPO), is a polymer containing optionally substituted phenyl rings linked with oxygen (O). It may also be referred to as poly(2,6 dimethyl-p-phenylene oxide).

In specific aspects the resin component includes PPE and polystyrene (PS). As used herein, "polystyrene" refers to polymers prepared using optionally substituted styrene, i.e., Ph-CH=CH2, and can be used interchangeably with poly (2,6 dimethyl-p-phenylene oxide). "Ph" refers a phenyl group. Polystyrenes contain optionally substituted styrene groups, i.e., —C(Ph)-C—, in the backbone of the polymer.

The PPE and PS components in the resin component may individually be homopolymers, copolymers, or a combination thereof. In some aspects the polystyrene does not include a rubber reinforcement; for example the polystyrene does not include styrene-butadiene rubber (SBR) or high impact polystyrene (HIPS). In a specific aspect the PPE includes a PPE copolymer. An exemplary PPE copolymer includes, but is not limited to, PPE-siloxane copolymer.

In certain aspects the composition includes from about 20 wt % to about 40 wt % PPE and from about 1 wt % to about 20 wt % PS.

The flow promoter includes at least a partially hydrogenated hydrocarbon resin. Partially hydrogenated hydrocarbon resin includes aromatic ring structures and unsaturated bonds. Fully hydrogenated hydrocarbon resins have substantially less unsaturated bonds or aromatic ring structures. As used herein, "partially hydrogenated" means that the hydrocarbon resin has a hydrogenation rate of at least about 60% and "fully hydrogenated" means that the hydrocarbon resin has a hydrogenation rate of at least about 90%.

The filler component may in some aspects include glass fiber, a titanate such as but not limited to calcium titanate, titanium dioxide, or a combination thereof.

In certain aspects the elastomer component includes a hydrogenated block copolymer of an alkenyl aromatic compound and a conjugated diene.

The elastomer component includes from 2.5 wt % to 5 wt % rubber content in the composition excluding the filler component. More specifically, rubber content in the composition may be calculated as the sum of the product of rubber content in the resin component multiplied by the corresponding resin component content in the composition and then divided by the resin content in the composition minus fillers (e.g., glass fiber and titanium dioxide).

In further aspects the composition includes at least one additional additive. The at least one additional additive may include, but is not limited to, an acid scavenger, an anti-drip agent, an antioxidant, an antistatic agent, a chain extender, a colorant, a release agent, an additional flow promoter, a lubricant, a plasticizer, a quenching agent, a flame retardant, a UV reflecting additive, an impact modifier, a blowing agent, a reinforcing agent, or a combination thereof.

Compositions according to aspects of the disclosure have improved properties as compared to conventional compositions. In some aspects the composition has a tensile strength at a speed of 5 millimeters per minute (mm/min) of at least 100 megapascals (MPa) as determined in accordance with ISO527. In further aspects the composition has a heat distortion temperature of at least 145° C. as determined using a 1.82 MPa load on 4 mm thick bars according to ISO75. In certain aspects the composition has a melt flow rate (MFR) of at least 20 grams per 10 minutes (g/10 min) at 300° C. and a 5 kilogram (kg) load as tested in accordance with ASTM D1238. In particular aspects the composition has a tensile strength retention, a flexural strength retention, or a notched Izod impact strength (NII) retention of at least 75% after heat ageing at 150° C. for 1000 hours, wherein tensile strength is determined at a speed of 5 mm/min in accordance with ISO527, flexural strength is determined at a speed of 2 mm/min in accordance with ISO178, and NII is determined at room temperature in accordance with ISO180.

Compositions according to aspects of the disclosure may also have good dielectric properties. In some aspects the compositions have a dielectric constant (Dk) of from 3.5 to 4.5 and a dissipation factor (DO of less than 0.005 as determined in accordance with the SABIC Method, further described herein.

Methods of Manufacture

The one or any foregoing components described herein may be first dry blended with each other, or dry blended with any combination of foregoing components, then fed into an extruder from one or multi-feeders, or separately fed into an extruder from one or multi-feeders. The fillers used in the disclosure may also be first processed into a masterbatch, then fed into an extruder. The components may be fed into the extruder from a throat hopper or any side feeders.

The extruders used in the disclosure may have a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, co-kneaders, disc-pack processors, various other types of extrusion equipment, or combinations including at least one of the foregoing.

The components may also be mixed together and then melt-blended to form the thermoplastic compositions. The melt blending of the components involves the use of shear force, extensional force, compressive force, ultrasonic energy, electromagnetic energy, thermal energy or combinations including at least one of the foregoing forces or forms of energy.

The barrel temperature on the extruder during compounding can be set at the temperature where at least a portion of the polymer has reached a temperature greater than or equal to about the melting temperature, if the resin is a semi-crystalline organic polymer, or the flow point (e.g., the glass transition temperature) if the resin is an amorphous resin.

The mixture including the foregoing mentioned components may be subject to multiple blending and forming steps if desirable. For example, the thermoplastic composition may first be extruded and formed into pellets. The pellets may then be fed into a molding machine where it may be formed into any desirable shape or product. Alternatively, the thermoplastic composition emanating from a single melt blender may be formed into sheets or strands and subjected to post-extrusion processes such as annealing, uniaxial or biaxial orientation.

The temperature of the melt in the present process may in some aspects be maintained as low as possible in order to avoid excessive thermal degradation of the components. In certain aspects the melt temperature is maintained between about 230° C. and about 350° C., although higher temperatures can be used provided that the residence time of the resin in the processing equipment is kept relatively short. In some aspects the melt processed composition exits processing equipment such as an extruder through small exit holes in a die. The resulting strands of molten resin may be cooled by passing the strands through a water bath. The cooled strands can be chopped into pellets for packaging and further handling.

Articles of Manufacture

In certain aspects, the present disclosure pertains to shaped, formed, or molded articles including the thermoplastic compositions. The thermoplastic compositions can be molded into useful shaped articles by a variety of means such as injection molding, extrusion, rotational molding, blow molding and thermoforming to form articles and structural components of, for example, personal or commercial electronics devices, including but not limited to cellular telephones, tablet computers, personal computers, notebook and portable computers, and other such equipment, medical applications, RFID applications, automotive applications, and the like. In a further aspect, the article is extrusion molded. In a still further aspect, the article is injection molded. In a particular aspect the article is a dipole antenna for an electronic communications device.

Various combinations of elements of this disclosure are encompassed by this disclosure, e.g., combinations of elements from dependent claims that depend upon the same independent claim.

Aspects of the Disclosure

In various aspects, the present disclosure pertains to and includes at least the following aspects.

Aspect 1. A thermoplastic composition comprising:
(a) about 30 wt % to about 60 wt % of a resin component comprising polyphenylene ether (PPE) and polystyrene (PS);
(b) from about 35 wt % to about 65 wt % of a filler component;
(c) from about 1 wt % to about 5 wt % of a flow promoter comprising at least a partially hydrogenated hydrocarbon resin; and
(d) an elastomer component comprising from 2.5 wt % to 5 wt % rubber content in the composition excluding the filler component,
wherein the combined weight percent value of all components does not exceed 100 wt %, and all weight percent values are based on the total weight of the composition except as indicated in (d).

Aspect 2. The thermoplastic composition according to Aspect 1, wherein the polystyrene does not comprise a rubber reinforcement.

Aspect 3. The thermoplastic composition according to Aspect 1 or 2, wherein the filler component comprises glass fiber, a titanate, titanium dioxide, or a combination thereof.

Aspect 4. The thermoplastic composition according to any of Aspects 1 to 3, wherein the composition comprises from about 20 wt % to about 40 wt % PPE and from about 1 wt % to about 20 wt % PS.

Aspect 5. The thermoplastic composition according to any of Aspects 1 to 4, wherein the PPE comprises a PPE homopolymer or a PPE copolymer.

Aspect 6. The thermoplastic composition according to Aspect 5, wherein the PPE comprises a PPE homopolymer.

Aspect 7. The thermoplastic composition according to any of Aspects 1 to 6, wherein the elastomer component comprises a hydrogenated block copolymer of an alkenyl aromatic compound and a conjugated diene.

Aspect 8. The thermoplastic composition according to any of Aspects 1 to 7, wherein the flow promoter comprises a fully hydrogenated hydrocarbon resin.

Aspect 9. The thermoplastic composition according to any of Aspects 1 to 8, wherein the composition has a tensile strength at a speed of 5 millimeters per minute (mm/min) of at least 100 megapascals (MPa) as determined in accordance with ISO527.

Aspect 10. The thermoplastic composition according to any of Aspects 1 to 9, wherein the composition has a heat distortion temperature of at least 145° C. as determined using a 1.82 MPa load on 4 mm thick bars according to ISO75.

Aspect 11. The thermoplastic composition according to any of Aspects 1 to 10, wherein the composition has a melt flow rate (MFR) of at least 20 grams per 10 minutes (g/10 min) at 300° C. and a 5 kilogram (kg) load as tested in accordance with ASTM D1238.

Aspect 12. The thermoplastic composition according to any of Aspects 1 to 11, wherein the composition has a dielectric constant (Dk) of from 3.5 to 4.5 and a dissipation factor (DO of less than 0.005 as determined in accordance with the SABIC Method.

Aspect 13. The thermoplastic composition according to any of Aspects 1 to 12, wherein the composition has a tensile strength retention, a flexural strength retention, or a notched Izod impact strength (NII) retention of at least 75% after heat ageing at 150° C. for 1000 hours, wherein tensile strength is determined at a speed of 5 mm/min in accordance with ISO527, flexural strength is determined at a speed of 2 mm/min in accordance with ISO178, and NII is determined at room temperature in accordance with ISO180.

Aspect 14. The thermoplastic composition according to any of Aspects 1 to 13, wherein the composition comprises at least one additional additive.

Aspect 15. The thermoplastic composition according to Aspect 14, wherein the at least one additional additive comprises an acid scavenger, an anti-drip agent, an antioxidant, an antistatic agent, a chain extender, a colorant, a release agent, an additional flow promoter, a lubricant, a plasticizer, a quenching agent, a flame retardant, a UV reflecting additive, an impact modifier, a blowing agent, a reinforcing agent, or a combination thereof.

Aspect 16. An article comprising the thermoplastic composition according to any of Aspects 1 to 15.

Aspect 17. The article according to Aspect 16, wherein the article is a dipole antenna for an electronic communications device.

Examples

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

Comparative and example compositions described herein included the components recited in Table 1:

TABLE 1

| | Components | | | |
|---|---|---|---|---|
| Component | Description | CAS number | Product supplier | Function |
| PPE | Poly (2,6-dimethyl-1,4-phenylene ether), CAS Reg. No. 25134-01-4, having an intrinsic viscosity of 0.33 deciliter/gram, determined at 25° C. in chloroform by Ubbelohde viscometer | 25134-01-4 | SABIC | Resin |
| HIPS | ET60, High impact polystyrene with butadiene content around 10% | 9003-55-8 | Idemitsu | Resin |
| GPPS | STYRON 680A, General purpose polystyrene | 9003-53-6 | Trinseo | Resin |
| $TiO_2$ | Titanium dioxide | 13463-67-7 | Chemours | Filler |
| GF | ECS306 Glass fiber, 13 um diameter | 65997-17-3 | CPIC | Filler |
| ARKON140 | ARKON P-140, Hydrogenated hydrocarbon resin, softening point 140° C. | 69430-35-9 | Arakawa Chemical | Flow promoter |
| ARKON125 | ARKON P-125, Hydrogenated hydrocarbon resin, softening point 125° C. | 69430-35-9 | Arakawa Chemical | Flow promoter |

TABLE 1-continued

| Component | Description | CAS number | Product supplier | Function |
|---|---|---|---|---|
| MD1537 | MD1537, Polystyrene-poly(ethylene/butylene)-polystyrene triblock copolymer, having a polystyrene content of 60 wt % | 66070-58-4 | Kraton | Elastomer |
| A1536 | A1536, Polystyrene-poly(ethylene/butylene)-polystyrene triblock copolymer, having a polystyrene content of 42 wt % | 66070-58-4 | Kraton | Elastomer |
| G1652 | G1652, Polystyrene-poly(ethylene/butylene)-polystyrene triblock copolymer, having a polystyrene content of 30 wt % | 66070-58-4 | Kraton | Elastomer |

Processing: the pellet compounding process was implemented on lab twin-screw extruder (Toshiba TEM-37BS) with all components except glass fiber fed from the main throat; glass fiber was fed downstream. The compounding proceeded with a screw rotation of 300 revolutions per minute (rpm) with a throughput of 30 kilograms per hour (kg/h). Temperature profiles for the compounding are provided in Table 2:

TABLE 2

Temperature profiles for compounding

| | | |
|---|---|---|
| Zone 1 temperature | ° C. | 50 |
| Zone 2 temperature | ° C. | 150 |
| Zone 3 temperature | ° C. | 280 |
| Zone 4 temperature | ° C. | 280 |
| Zone 5 temperature | ° C. | 280 |
| Zone 6 temperature | ° C. | 280 |
| Zone 7 temperature | ° C. | 300 |
| Zone 8 temperature | ° C. | 300 |
| Zone 9 temperature | ° C. | 300 |
| Zone 10 temperature | ° C. | 300 |
| Zone 11 temperature | ° C. | 300 |
| Zone 12 temperature | ° C. | 300 |
| Die temperature | ° C. | 300 |

Injection molding: injection molding was performed on a Sumitomo DEMAG SE180EV molding machine to form plaques for dielectric (Dk, DO measurement and on a FANUC S-2000i 100A molding machine for bars for the mechanical and thermal (tensile/flexure/impact/HDT) tests. Molding conditions are listed in Table 3:

TABLE 3

Injection molding conditions

| Molding parameters | Unit | Value |
|---|---|---|
| Pre-drying time | Hour | 4 |
| Pre-drying temperature | ° C. | 120 |
| Zone 1 temperature | ° C. | 280 |
| Zone 2 temperature | ° C. | 290 |
| Zone 3 temperature | ° C. | 300 |
| Nozzle temperature | ° C. | 300 |
| Mold temperature | ° C. | 120 |

The following standards/conditions were used for the testing of indicated properties: melt flow rate (MFR) was measured at 300° C. and a 5 kilogram load according to ASTM D1238; tensile properties (modulus, strength and elongation at break) were determined at a speed of 5 millimeters per minute (mm/min) according to ISO527; flexural properties (modulus and strength) were determined at a speed of 2 mm/min according to ISO178; notched Izod impact strength (NII) was determined at room temperature (23° C.) according to ISO180; heat distortion temperature (HDT) was determined using a 1.82 megapascal (MPa) load on 4 mm thick bars according to ISO75; dielectric constant (Dk) and dissipation factor (Df) were determined according to the SABIC method by measuring these properties on 75 mm×75 mm×2.5 mm plaques at 1.9 gigahertz (GHz), with a QWED split post dielectric resonator and an Agilent PNA network analyzer; and heat aging was performed by placing tensile/flexural/NII bars into an oven at 150° C. for 1000 hours. The tensile/flexural/notched Izod impact strength after heat aging was compared to the values before heat aging to determine the retention (in %).

Comparative compositions and their properties are listed in Table 4A; example compositions and their properties are listed in Table 4B:

TABLE 4A

| | Comparative Compositions | | | | | | | |
|---|---|---|---|---|---|---|---|---|
| | C1 | C2 | C3 | C4 | C5 | C6 | C7 | C8 |
| Component (wt %) | | | | | | | | |
| PPE | 28.8 | 33.55 | 28.8 | 33.8 | 29.2 | 29.2 | 29.2 | 33.8 |
| TiO$_2$ | 17 | 17 | 17 | 17 | 20 | 15 | 20 | 17 |
| GF | 33 | 33 | 33 | 33 | 30 | 35 | 30 | 33 |
| GPPS | 10 | 10 | 10 | 10 | 5 | 10 | | 10 |
| ARKON140 | 5 | 2.75 | 5 | | | | | 5 |
| ARKON125 | | | | | 5 | 5 | 5 | |
| MD1537 | | 2.5 | | | | | | |

TABLE 4A-continued

| | Comparative Compositions | | | | | | | |
|---|---|---|---|---|---|---|---|---|
| | C1 | C2 | C3 | C4 | C5 | C6 | C7 | C8 |
| G1652 | 5 | | | | | | | |
| HIPS | | | 5 | 5 | 10 | 5 | 15 | |
| Conventional additive package | 1.2 | 1.2 | 1.2 | 1.2 | 0.8 | 0.8 | 0.8 | 1.2 |
| Rubber content in resin % | 7 | 2 | 1 | 1 | 2 | 1 | 3 | 0 |
| Properties | | | | | | | | |
| MFR, g/10 min | 39 | 22 | 35 | 18 | 26 | 29 | 21 | 27 |
| Tensile modulus (TM) (MPa) | 6446 | 9960 | 10669 | 10201 | 10089 | 11149 | 9763 | 10582 |
| Tensile strength (TS) (MPa) | 79 | 115 | 105 | 114 | 111 | 112 | 106 | 108 |
| Tensile elongation at break (TE) (%) | 2.4 | 1.9 | 1.6 | 1.8 | 1.7 | 1.7 | 1.8 | 1.5 |
| Flexure modulus (FM) MPa | 5946 | 8745 | 9497 | 9246 | 9143 | 10027 | 8904 | 9453 |
| Flexure strength (FS) MPa | 104 | 160 | 142 | 156 | 150 | 158 | 157 | 141 |
| Notched Izod impact (NII) (kJ/m2) | 5.3 | 6.6 | 5.6 | 6.3 | 6.4 | 5.5 | 6.5 | 5.9 |
| HDT, ° C. | 143 | 159 | 147 | 158 | 148 | 148 | 150 | 157 |
| Dk (1.9 GHz) | 3.9 | 3.9 | 3.9 | 4.0 | 4.0 | 3.9 | 4.0 | 3.9 |
| Df (1.9 GHz) | 0.003 | 0.003 | 0.003 | 0.003 | 0.003 | 0.003 | 0.003 | 0.003 |
| After heat ageing at 150° C. for 1000 hours | | | | | | | | |
| Tensile strength retention % | 93 | 75 | 62 | 60 | 62 | 64 | 63 | 67 |
| Flexure strength retention % | 89 | 67 | 73 | 63 | 65 | 70 | 62 | 71 |
| Notched Izod impact retention % | 100 | 87 | 100 | 83 | 99 | 100 | 96 | 89 |

TABLE 4B

| | Example Compositions | | | | |
|---|---|---|---|---|---|
| | Ex1 | Ex2 | Ex3 | Ex4 | Ex5 |
| Component (wt %) | | | | | |
| PPE | 32.3 | 30.55 | 29.3 | 30.55 | 28.8 |
| TiO$_2$ | 17 | 17 | 17 | 17 | 17 |
| GF | 33 | 33 | 33 | 33 | 33 |
| GPPS | 10 | 13 | 13 | 13 | 10 |
| ARKON140 | 2.75 | 1.5 | 2.75 | 2.75 | 5 |
| MD1537 | 3.75 | 3.75 | 3.75 | | 5 |
| A1536 | | | | 2.5 | |
| Conventional additive package | 1.2 | 1.2 | 1.2 | 1.2 | 1.2 |
| Rubber content in resin % | 3 | 3 | 3 | 2.9 | 4 |
| Properties | | | | | |
| MFR, g/10 min | 22 | 24 | 28 | 32 | 30 |
| Tensile modulus (TM) (MPa) | 9418 | 9745 | 9740 | 9629 | 8813 |
| Tensile strength (TS) (MPa) | 111 | 113 | 112 | 111 | 100 |
| Tensile elongation at break (TE) (%) | 2.0 | 1.9 | 1.9 | 1.9 | 2.0 |
| Flexure modulus (FM) MPa | 8292 | 8768 | 8530 | 8600 | 8538 |
| Flexure strength (FS) MPa | 153 | 159 | 158 | 156 | 143 |
| Notched Izod impact (NII) (kJ/m2) | 7.1 | 7.0 | 7.0 | 6.3 | 6.7 |
| HDT, ° C. | 156 | 152 | 150 | 150 | 148 |
| Dk (1.9 GHZ) | 3.9 | 3.9 | 3.9 | 3.9 | 3.9 |
| Df (1.9 GHZ) | 0.003 | 0.003 | 0.003 | 0.003 | 0.003 |
| After heat ageing at 150° C. for 1000 hours | | | | | |
| Tensile strength retention % | 79 | 85 | 81 | 77 | 83 |
| Flexure strength retention % | 76 | 78 | 79 | 78 | 84 |
| Notched Izod impact retention % | 85 | 92 | 87 | 95 | 92 |

The rubber content in the resin was calculated as the product of elastomer or HIPS content and rubber content in it, divided by the resin content excluding TiO$_2$ and GF. For example composition Ex5 includes 5 wt % MD1537 which includes 40 wt % rubber and 60 wt % PS, which equates to 2% rubber. Excluding GF and TiO$_2$ (50 wt %) leaves 50 wt % resin, so the overall content of rubber in the resin is 4 wt %.

From the data it was observed that Ex5 had good properties, including TS≥100 MPa, HDT>145° C., MFR>20 g/10 min, greater than 75% TS/FS/NII retention after ageing, a Dk of 3.9 and a Df less than 0.005.

Comparing Ex5 with the comparative examples:
- C1 had a rubber content of 7 wt % due in part to the high rubber content SEBS (G1652), resulting in low HDT and tensile strength but good mechanical retention after heat aging.
- C2 included only 2.5 wt % SEBS (MD1537) and only 2% rubber content in the resin, resulting in low tensile and flexural retention after heat aging.
- C3-C7 included HIPS as rubber source, which is unsaturated rubber. Each of these compositions had low tensile and flexural retention after heat aging, even though the rubber content in resin of C7 was 3 wt %, the same as Ex1-Ex3. It is believed that this is due to the unsaturated rubber in HIPS which is not as stable as the hydrogenated rubber in SEBS under heat aging. The double bonds in HIPS degrade during heat ageing. Composition C4 exhibits very low MFR due to lack of hydrogenated hydrocarbon resin.
- C8 includes no rubber, resulting in low tensile and flexural retention after heat aging.

The above description is intended to be illustrative, and not restrictive. For example, the above-described examples (or one or more aspects thereof) may be used in combination with each other. Other aspects can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description as examples or aspects, with each claim standing on its own as a separate aspect, and it is contemplated that such aspects can be combined with each other in various combinations or permutations. The scope of the disclosure should be determined with reference to the appended claims, along with the full scope of equivalents to which such claims are entitled.

What is claimed is:

1. A thermoplastic composition comprising:
   (a) about 30 wt % to about 60 wt % of a resin component comprising polyphenylene ether (PPE) and polystyrene (PS), wherein the PS does not comprise a rubber reinforcement;
   (b) from about 35 wt % to about 65 wt % of a filler component;
   (c) from about 1 wt % to about 5 wt % of a flow promoter comprising at least a partially hydrogenated hydrocarbon resin; and
   (d) an elastomer component comprising from 2.5 wt % to 5 wt % rubber content in the composition excluding the filler component,
   wherein the combined weight percent value of all components does not exceed 100 wt %, and all weight percent values are based on the total weight of the composition except as indicated in (d),
   wherein components (c) and (d) are distinct components, and
   wherein the composition has a tensile strength retention, a flexural strength retention, or a notched Izod impact strength (NII) retention of at least 75% after heat ageing at 150° C. for 1000 hours, wherein tensile strength is determined at a speed of 5 mm/min in accordance with ISO527, flexural strength is determined at a speed of 2 mm/min in accordance with ISO178, and NII is determined at room temperature in accordance with ISO180.

2. The thermoplastic composition according to claim 1, wherein the filler component comprises glass fiber, a titanate, titanium dioxide, or a combination thereof.

3. The thermoplastic composition according to claim 1, wherein the composition comprises from about 20 wt % to about 40 wt % PPE and from about 1 wt % to about 20 wt % PS.

4. The thermoplastic composition according to claim 1, wherein the PPE comprises a PPE homopolymer or a PPE copolymer.

5. The thermoplastic composition according to claim 4, wherein the PPE comprises a PPE homopolymer.

6. The thermoplastic composition according to claim 1, wherein the elastomer component comprises a hydrogenated block copolymer of an alkenyl aromatic compound and a conjugated diene.

7. The thermoplastic composition according to claim 1, wherein the flow promoter comprises a fully hydrogenated hydrocarbon resin.

8. The thermoplastic composition according to claim 1, wherein the composition has a tensile strength at a speed of 5 millimeters per minute (mm/min) of at least 100 megapascals (MPa) as determined in accordance with ISO527.

9. The thermoplastic composition according to claim 1, wherein the composition has a heat distortion temperature of at least 145° C. as determined using a 1.82 MPa load on 4 mm thick bars according to ISO75.

10. The thermoplastic composition according to claim 1, wherein the composition has a melt flow rate (MFR) of at least 20 grams per 10 minutes (g/10 min) at 300° C. and a 5 kilogram (kg) load as tested in accordance with ASTM D1238.

11. The thermoplastic composition according to claim 1, wherein the composition has a dielectric constant (Dk) of from 3.5 to 4.5 and a dissipation factor (Df) of less than 0.005 as determined in accordance with the SABIC Method.

12. The thermoplastic composition according to claim 1, wherein the composition comprises at least one additional additive, wherein the at least one additional additive comprises an acid scavenger, an anti-drip agent, an antioxidant, an antistatic agent, a chain extender, a colorant, a release agent, an additional flow promoter, a lubricant, a plasticizer, a quenching agent, a flame retardant, a UV reflecting additive, an impact modifier, a blowing agent, a reinforcing agent, or a combination thereof.

13. An article comprising the thermoplastic composition according to claim 1, wherein the article is a dipole antenna for an electronic communications device.

* * * * *